United States Patent [19]
Johnson et al.

[11] 3,872,643
[45] Mar. 25, 1975

[54] METHOD FOR PACKING ARTICLES IN A CARTON

[75] Inventors: Robert B. Johnson, Santa Clara; Louis F. Robert, Belmont, both of Calif.

[73] Assignee: Fibreboard Corporation, San Francisco, Calif.

[22] Filed: Apr. 3, 1974

[21] Appl. No.: 457,460

Related U.S. Application Data

[62] Division of Ser. No. 310,336, Nov. 29, 1972, Pat. No. 3,834,115.

[52] U.S. Cl. ............................................. 53/26
[51] Int. Cl. .......................................... B65b 35/44
[58] Field of Search ....... 53/26, 237, 240, 244, 250, 53/251

[56] References Cited
UNITED STATES PATENTS

| | | | |
|---|---|---|---|
| 2,930,172 | 3/1960 | Pettee et al. | 53/250 X |
| 2,976,659 | 3/1961 | Flanagan et al. | 53/237 |
| 3,555,770 | 1/1971 | Rowekamp | 53/251 X |

Primary Examiner—Travis S. McGehee
Attorney, Agent, or Firm—Phillips, Moore, Weissenberger, Lempio & Strabala

[57] ABSTRACT

An apparatus sequentially comprises an article infeed station for conveying a plurality of sealed bags in tandem, an article conveying station for receiving and moving the bags transversely relative to the infeed station, a carton conveying station for simultaneously moving shipping cartons parallel to the article conveying station and a packing station for depositing layers of the bags in the cartons. The infeed station comprises a plurality of parallel chutes and an underlying conveyor which sequentially deposits a bag from each chute onto a conveyor of the article conveying station. The latter conveyor moves the bags into the packing station whereat each bag is picked up by a vacuum head and deposited into a carton which is moved thereunder by a conveyor of the carton conveying station.

9 Claims, 19 Drawing Figures

METHOD FOR PACKING ARTICLES IN A CARTON

CROSS-REFERENCE TO RELATED APPLICATION

This application is a Divisional Application of U.S. Ser. No. 310,336, filed Nov. 29, 1972, now U.S. Pat. No. 3,834,115, for "Bag Packing Apparatus and Method."

BACKGROUND OF THE INVENTION

Bag packing apparatus, such as those employed for packing sealed plastic or cellophane bags containing prunes or like commodities in a shipping carton, normally require a number of time consuming manual work tasks to accomplish same. The bags are normally manually picked up and placed in a shipping carton which not only involves substantial labor costs, but also does not insure precise packing of the bags in the carton.

SUMMARY OF THIS INVENTION

An object of this invention is to overcome the above, briefly described problems by providing an article packing apparatus and method for expeditiously, efficiently and automatically placing a plurality of articles, such as sealed bags, in a shipping carton.

The apparatus comprises an article infeed station preferably having a plurality of parallel chutes and underlying first conveying means for precisely moving rows of such articles into an article conveying station. The latter station comprises a second conveying means, transversely disposed relative to the first conveying means, for moving the articles into an article packing station. Simultaneously therewith, a carton conveying station, comprising an endless third conveying means, moves open-topped shipping cartons parallel and adjacent to the articles whereby packing means, preferably comprising vacuum or suction heads, deposit the articles in the cartons.

BRIEF DESCRIPTION OF THE DRAWINGS

Other objects of this invention will become apparent from the following description and accompanying drawings wherein.

DETAILED DESCRIPTION

General Description

Figure 1:
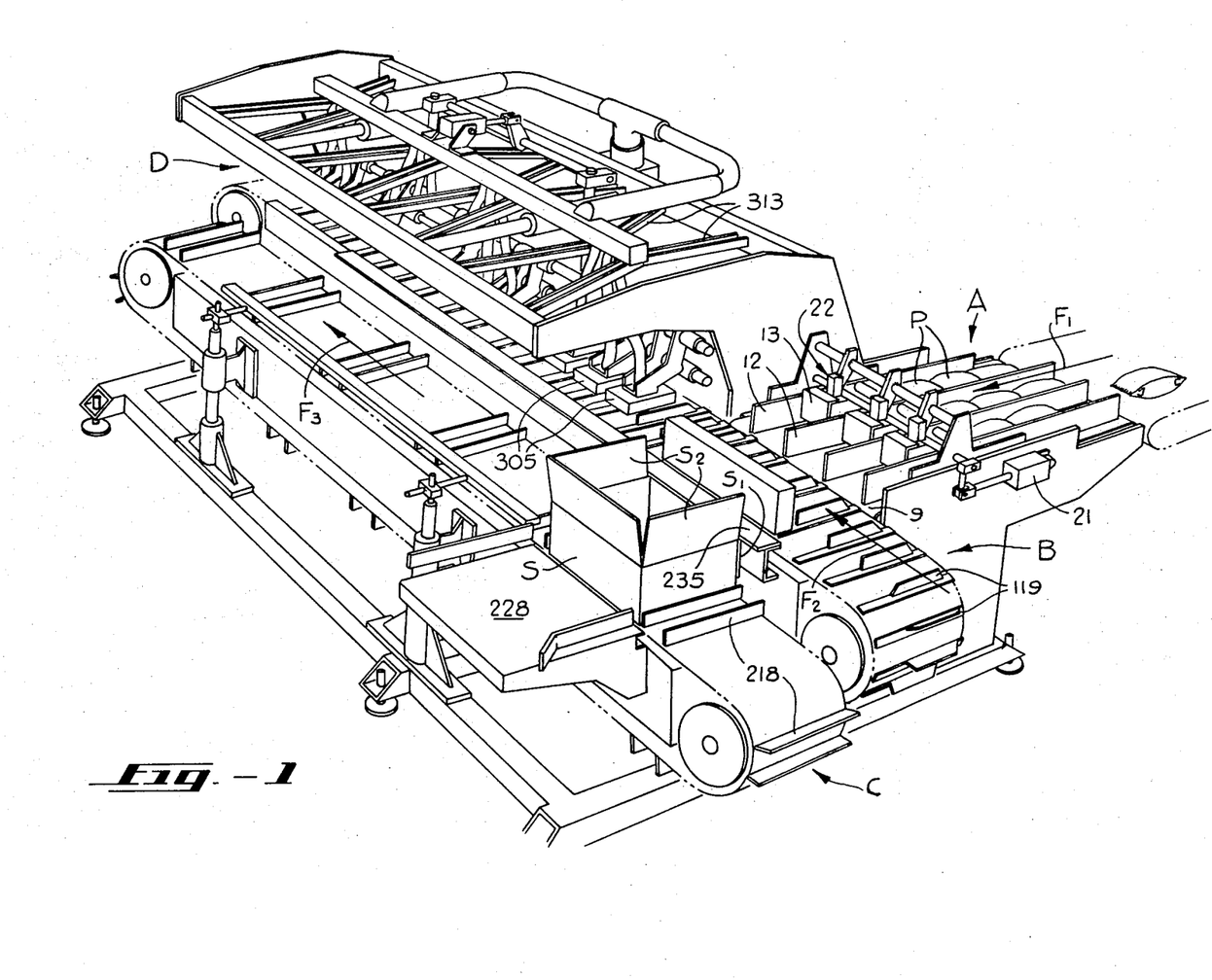
FIG. 1 is a perspective view of a bag packing apparatus embodying this invention comprising a bag infeed station A, a bag conveying station B, a carton conveying station C and a bag packing station D.

The bag packing apparatus illustrated in FIG. 1 comprises a bag infeed station A adapted to convey multiple rows of packaged articles, such as bagged prunes or the like, along a first linear flight path $F_1$. The leading article of each row is deposited into an article conveying station B which in turn moves the leading articles in tandem along a second linear flight path $F_2$, transversely to flight path $F_1$. Simultaneously therewith, a carton conveying station C moves a plurality of shipping cartons, such as corrugated cases, along a linear flight path $F_3$ which is substantially parallel to flight path $F_2$. Each shipping carton stops momentarily, adjacent to an article packing station D, whereat a first group of vacuum or suction heads engage a first layer of three articles P and deposit same into a carton. The cartons are subsequently fully packed by superimposing second, third and fourth layers of such articles on the first layer whereafter the filled carton is removed from the carton conveying and bag packing stations for shipment.

Bag Infeed Station

Figure 2:
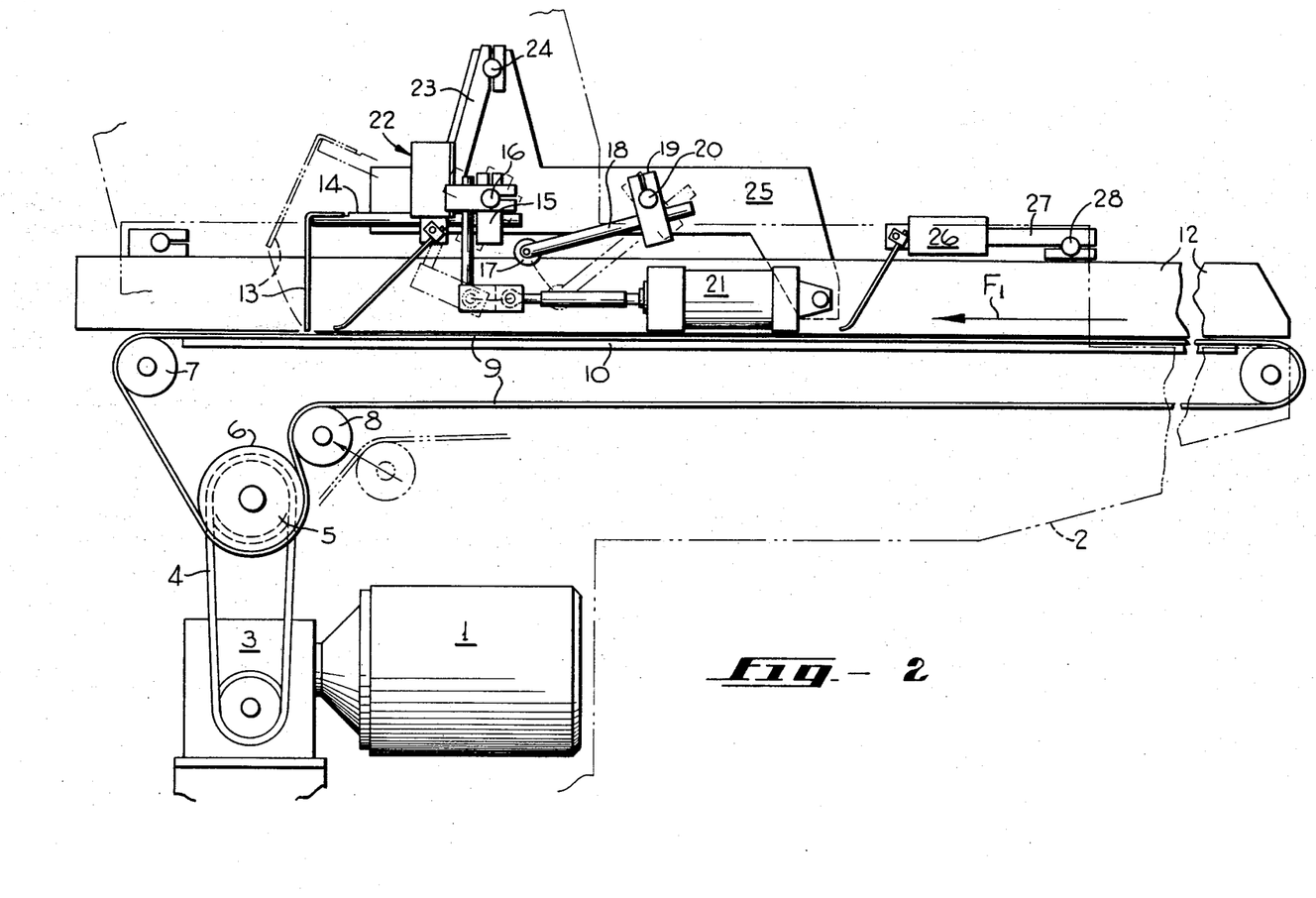
FIG. 2 is a side elevational view of the bag infeed station, with parts broken-away for clarification purposes.
Figure 3:
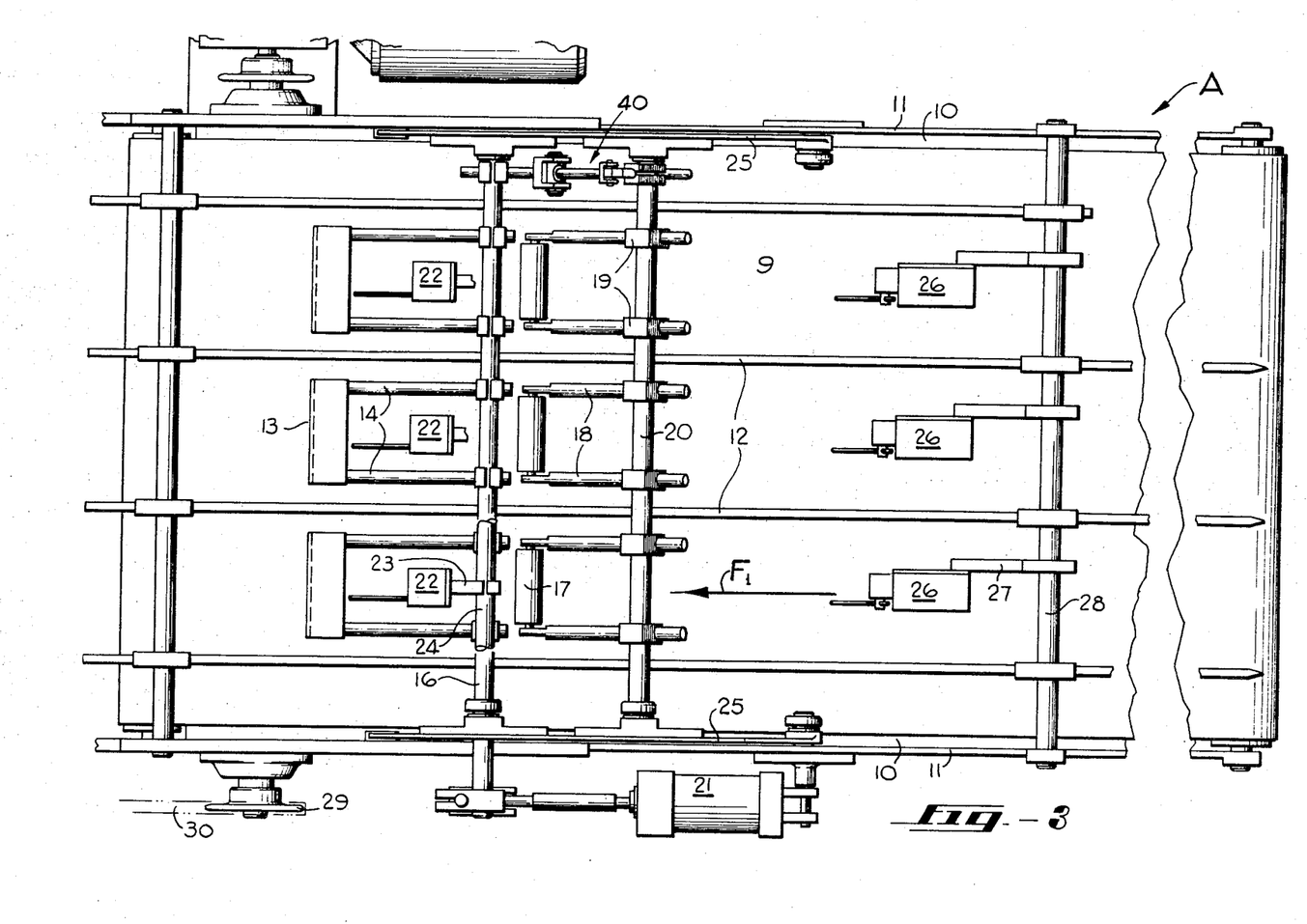
FIG. 3 is a top plan view of the bag infeed station.
Figure 4:
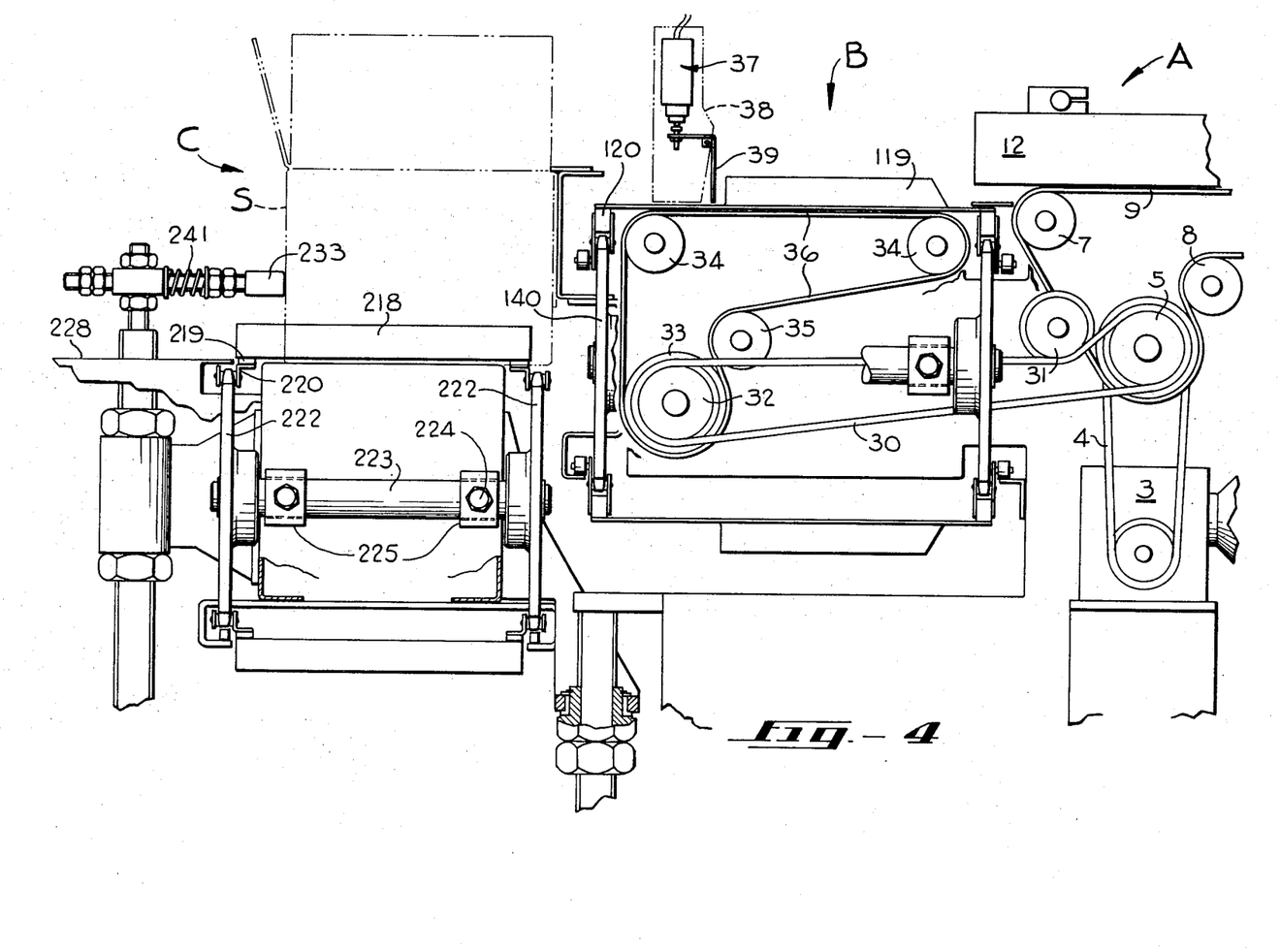
FIG. 4 is an end elevational view of the bag and carton conveying stations, with parts broken-away for clarification purposes.

Bag infeed station A, clearly shown in FIGS. 2–4, comprises a power input means sequentially including a variable speed electric drive motor 1, mounted on a stationary frame 2 of the apparatus, a gear reduction means 3, an endless chain 4, a drive sprocket 5, a drive roller 6, a wrap roller 7, a takeup roller 8 and a first endless conveyor belt 9. The motor thus functions to continuously drive the upper portion of belt 9 along a linear flight path $F_1$. The upper portion of the belt is supported by an underlying support plate 10, secured to stationary frame 2.

Upstanding side frames 11 are secured to the stationary frame along with a plurality of parallel and equally spaced infeed side guides 12. Each pair of adjacent side guides comprise guide means defining a chute which guides a row of bags P linearly for their transfer to bag conveying station B by conveyor belt 9. Stop gate means, comprising identical stop gates 13 secured to support rods 14, are disposed in each of the chutes for alternately closing to prevent the passage of a leading article thereby and for opening to permit the passage of such article thereby.

Each pair of support rods are attached to a clamp block 15 which is secured to a pivot shaft 16 rotatably mounted on side frames 25. A hold-back roller 17, rotatably mounted on a rod 18 secured to a clamp block 19, is positioned upstream of a respective stop gate means for holding a trailing article in response to opening of the stop gate means. The clamp block is, in turn, secured to a pivot shaft 20 rotatably mounted on side frames 25. Actuating means preferably comprising a double-acting cylinder 21 is pivotally mounted on one of the side frames 11 and has its rod end interconnected with pivot shaft 16 by the bellcrank mechanism illustrated in FIGS. 2 and 3.

A sensing switch 22 is mounted above conveyor 9 and adjacent to each stop gate 13 to have a probe thereof intersect each chute for purposes hereinafter described. Each switch is mounted on a bracket 23 secured to a shaft 24, attached to side frames 25. Subside frames 25 are secured to side frames 11 to detachably mount the feed gate and roller assemblies as a unit thereon. Bag backup sensing switches 26 are each secured to a bracket 27, attached to a support shaft 28 secured to side frames 11.

A drive sprocket 29 (FIG. 3), driven by a common shaft mounting drive sprocket 5 thereon, engages an endless chain 30 (FIG. 4) which is properly tensioned by a takeup sprocket 31 and drives a sprocket 32 and a drive roller 33. Wrap rollers 34 and a takeup roller 35 engage a second endless conveyor belt 36, driven by roller 33. Adjacent conveyor belts 9 and 36 are longitudinally aligned for conveying bags P to bag conveying station B. A switch 37 (FIGS. 4 and 5) is mounted in a housing 38, positioned forwardly of each chute defined by infeed side guides 12 and comprises a probe 39 adapted to be tripped by one of the bags.

Bag Conveying Station B

Figure 5:
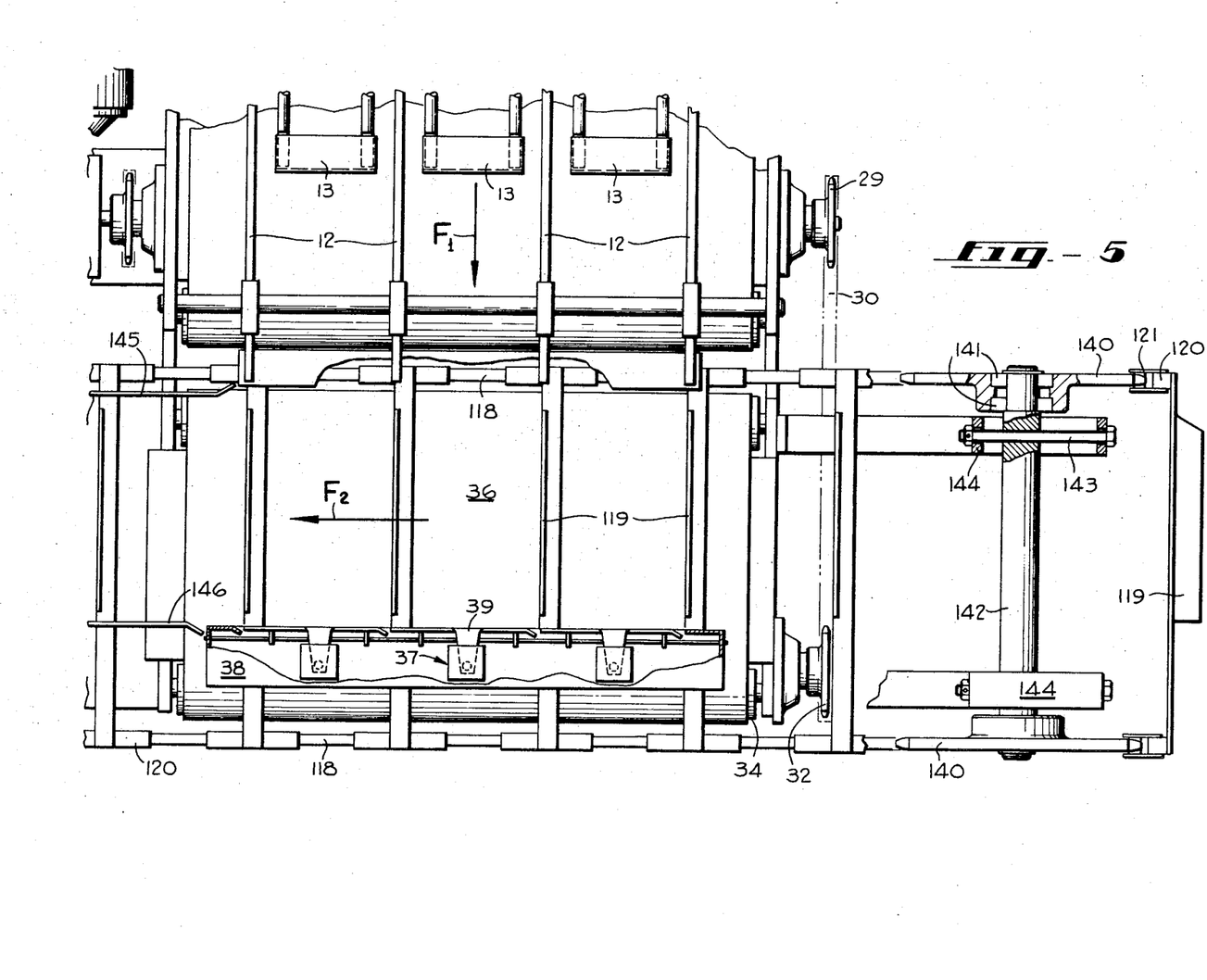
FIGS. 5 and 6 are top plan views of the bag conveying station, with parts broken-away for clarification purposes.
Figure 6:
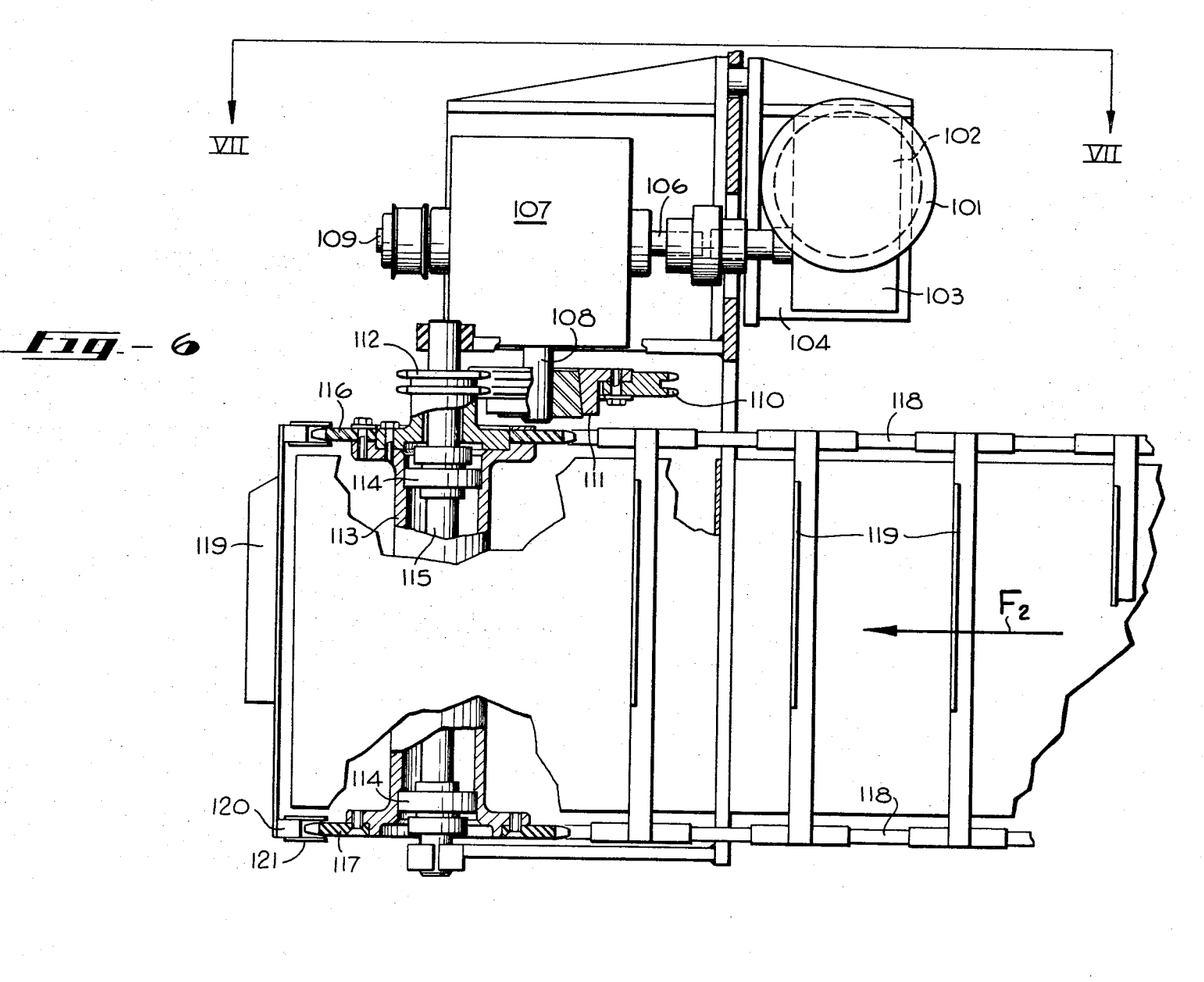
Figure 7:
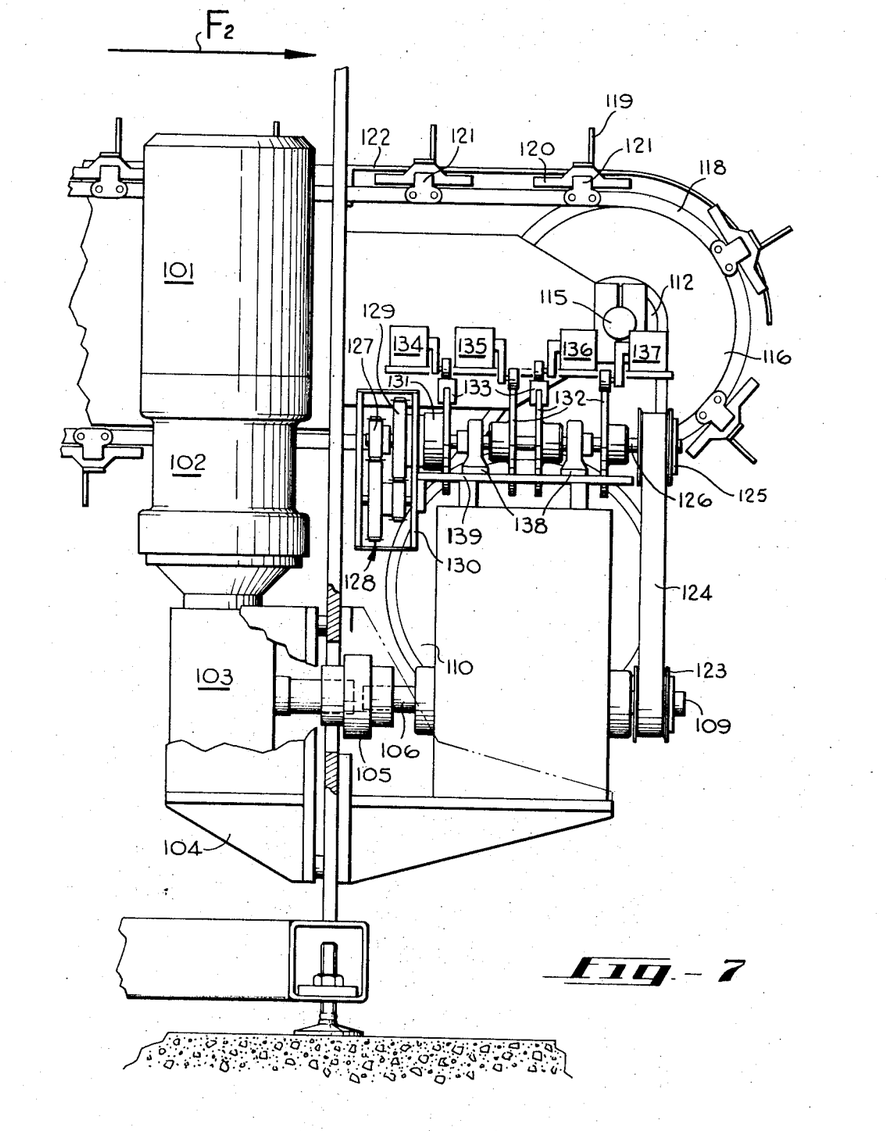
FIG. 7 is a back elevational view taken in the direction of arrows VII—VII in FIG. 6, with parts broken-away for clarification purposes.

The bag conveying station, disposed transversely relative to bag infeed station A, is adapted to receive the three aligned bags and to convey them along a second linear flight path $P_2$. Referring to FIGS. 5-7, the bag conveying station comprises a drive motor 101 (FIG. 7) operatively connected to a clutch-brake assembly 102 and a speed reducer 103. The speed reducer is mounted on a stationary base 104 and is operatively connected to a coupling 105 and an index drive input shaft 106. An index drive unit 107 receives rotary power from input shaft 106 and, in turn, drives output shafts 108 (FIG. 6) and 109 (FIG. 7).

As further shown in FIG. 6, a sprocket 110 is secured to a hub 111 which is attached to output shaft 108. A chain (not shown) is mounted on sprocket 110 and a sprocket 112, secured to a hub 113. The hub has laterally spaced bearings 114 mounted therein to rotatably mount the hub on a stationary cross-shaft 115. A pair of sprockets 116 and 117 are attached to the outboard ends of the hub to engage laterally spaced conveyor chains 118.

Transversely disposed an longitudinally spaced flight bars 119 are attached to the chains to accommodate a bag P (FIG. 1) between each adjacent pair thereof. Each flight bar is attached to a respective chain by a stabilizer lug 120 and a pair of links 121. A stationary support plate or slider bed 122 is secured to the frame of the machine to support the bags during their movement along flight path $F_2$.

Returning to FIG. 7, sprocket 123 is secured to continuously rotating output shaft 109 and has a timing belt 124 entrained thereon and also on a second, driven sprocket 125. A cam shaft 126 is secured to sprocket 125 to be driven thereby and has its opposite end secured to an input gear 127. The gear meshes with a cluster gear 128 which, in turn, meshes with an output gear 129 to form a reducer gear set thereat. A stationary housing 130 encloses the gear set which functions to step-down the speed of gear 129 from that of shaft 126 at a 1:4 ratio.

A cam disc 131 is attached to output gear 129 whereas second cam discs 132 are mounted on shaft 126 to rotate therewith at a 1:1 speed ratio. A cam lobe 133 is attached to each cam disc to engage the probes of respective switches 134, 135, 136 and 137 for purposes hereinafter explained. Shaft 126 is mounted in longitudinally spaced bearing journals 138 mounted on a stationary frame 139.

Referring to FIG. 5, idler sprockets 140 are mounted for rotation on laterally spaced bearings 141 (one shown), having their inner races secured to a stationary cross-shaft 142. A pair of takeup bolts 143 are each mounted in a stationary support 144 to adjust shaft 142 longitudinally. An upstanding side guide 145 is secured to the frame of the apparatus and cooperates with a laterally spaced, adjustable side guide 146 to assure precise movement of the bags along flight path $F_2$.

Carton Conveying Station C

Referring to FIGS. 8-11, the carton conveying station comprises an electrical drive motor 201 having its output shaft (not shown) operatively connected to a clutch and brake assembly 202 and a speed reduction gear assembly 203. The speed reduction gear assembly rotates a drive sprocket 204, having an endless chain 205 mounted thereon and on a driven sprocket 206. A cross-shaft 207 has a timing drive sprocket 208 secured thereon which engages an endless chain 209. The chain is further entrained on a second timing driven sprocket 210, secured to a timing shaft 211.

A timing cam 212 is secured to an end of shaft 211 and has a cam lobe for selectively tripping the probe of an electrical sensing switch 214 operatively connected to clutch and brake assembly 202. Sprockets 215 and 216 are secured to cross-shaft 207 and engage laterally spaced conveyor chains 217, having longitudinally spaced flight bars 218 secured therebetween by stabilizing mounts 219 and attaching links 220. A stationary platen or conveyor bed 221 is horizontally disposed to support the cartons during their movement along flight path $F_3$.

Figures 8, 11:
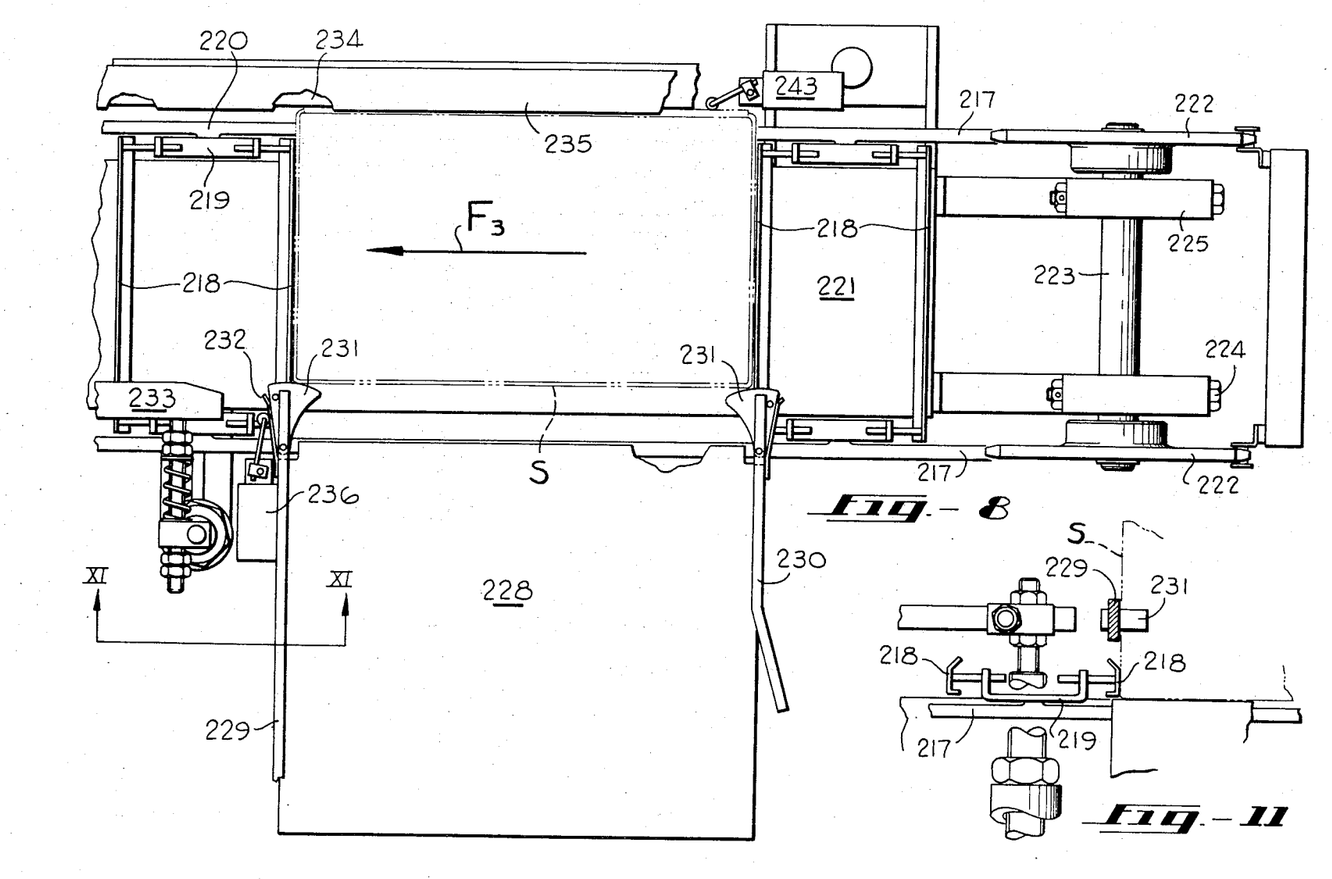
FIGS. 8 and 9 are top plan views of the carton conveying station, with portions broken-away for clarification purposes.
FIG. 11 is a sectional view taken in the direction of arrows XI—XI in FIG. 8.
Figure 9:
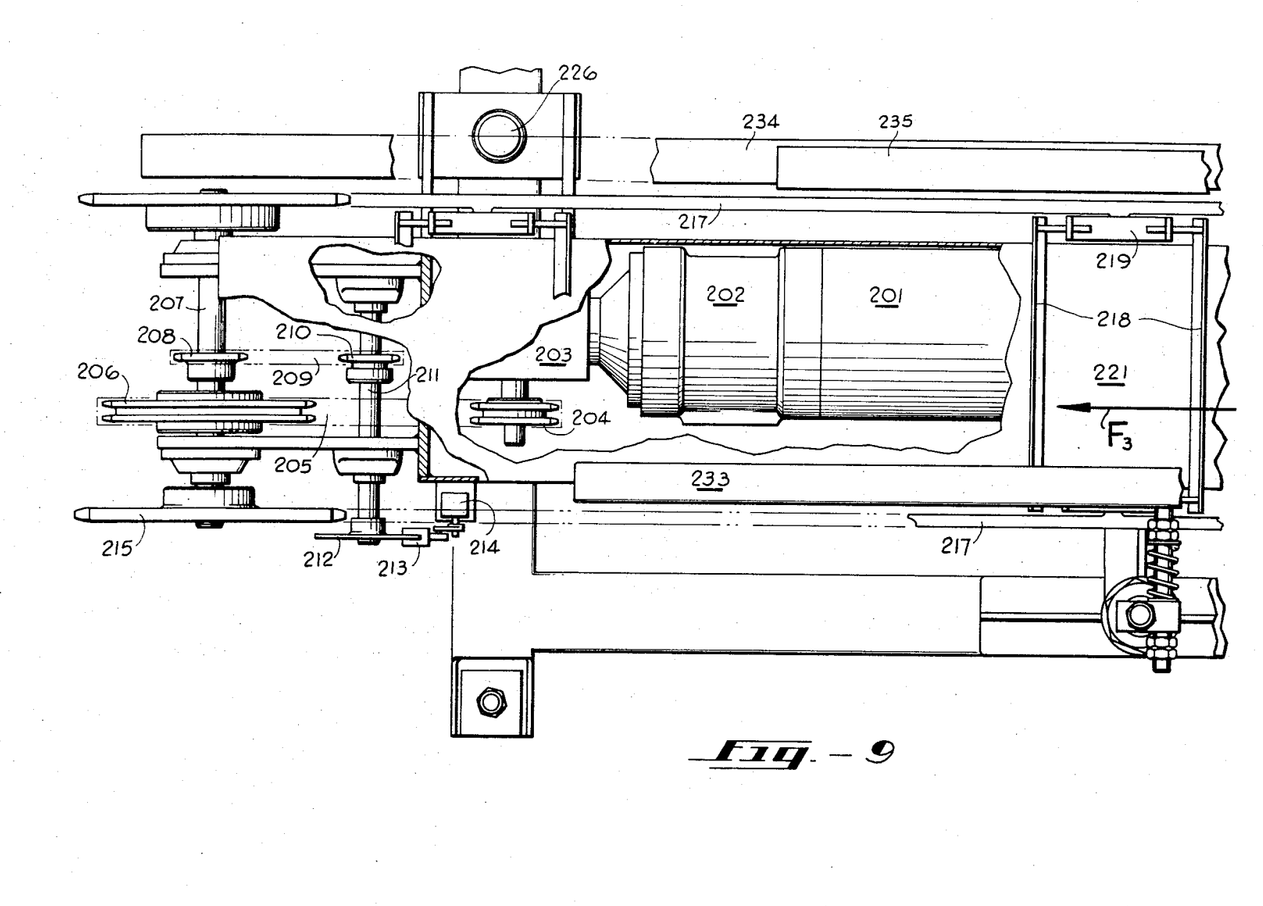
Figure 10:
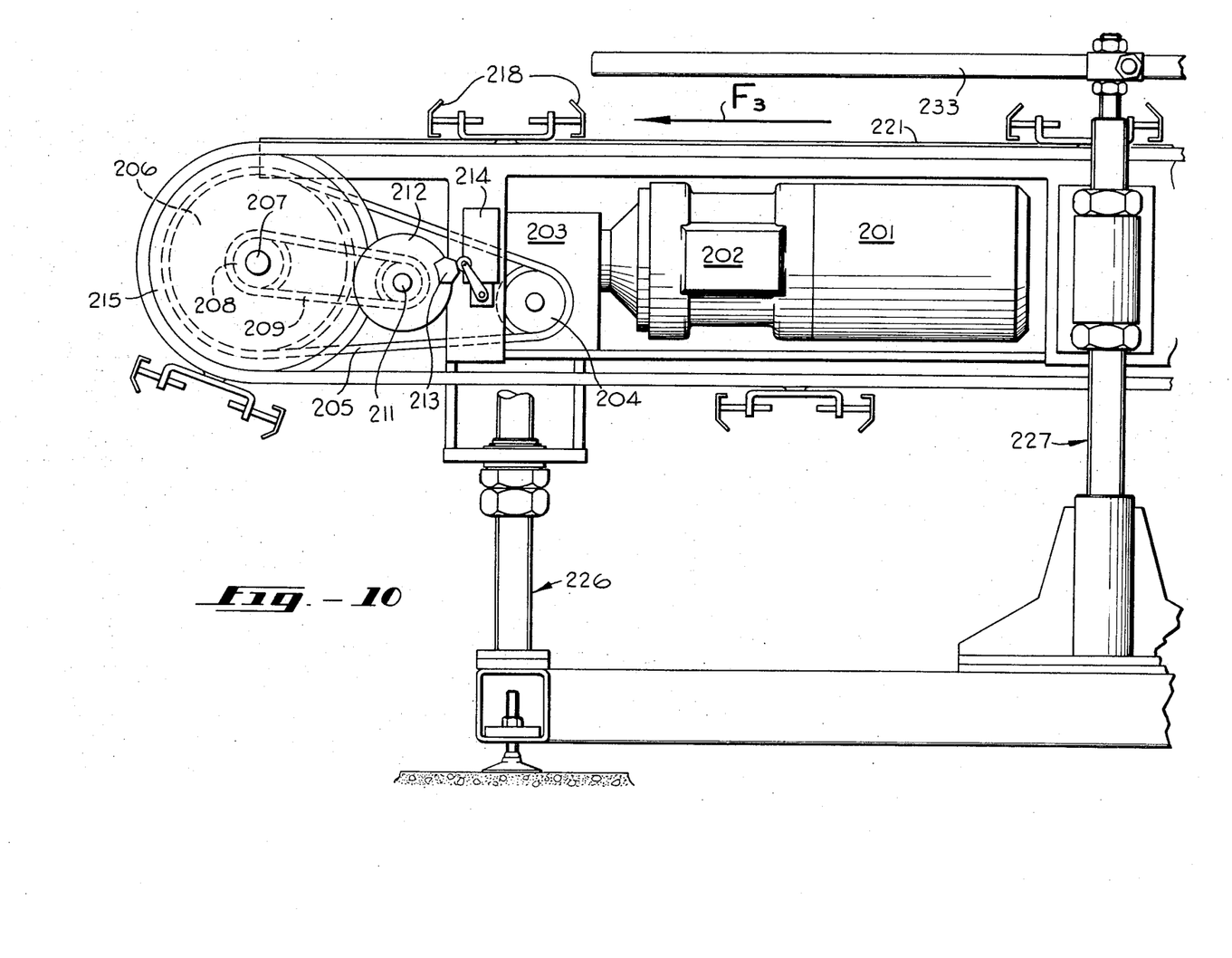
FIG. 10 is a side elevational view of the portion of the carton conveying station illustrated in FIG. 11, with parts broken-away for clarification purposes.

Referring to FIG. 8, idler sprockets 222 each carry one end of an endless chain 217. The sprockets are attached to a cross-shaft 223, secured by bolts 224 and stationary supports 225, similar in construction to corresponding bolts 143 and supports 144 (FIG. 5). The carton conveying means may be supported by vertically disposed posts, such as those illustrated at 226 and 227 in FIG. 10.

Referring to FIG. 8, a horizontally disposed carton infeed table 228 has laterally spaced and vertically disposed side guides 229 and 230 secured thereon. Latches 231 are pivoted at the forward ends thereof on the guides and are each spring-loaded by a leaf spring 232. Outer and inner parallel carton guides 233 and 234, respectively, are secured on each side of the carton conveying means to guide the carton along flight path $F_3$. A hold-down lip 235 is formed on inner guide 234. A primary carton sensing switch 236 has a probe engaging one spring 232 and is adapted to be tripped thereby upon counterclockwise movement of latch 231 when a carton passes thereby. Secondary carton sensing switch 237 has a probe adapted to be tripped by its engagement with a leading sidewall of the carton when it is urged thereagainst.

Bag Packing Station D

Referring to FIGS. 1 and 12-15, the bag packing station comprises a connector tube 301 (FIG. 12) which selectively communicates a vacuum to a manifold 302. Nipples 303 communicate the vacuum, via flexible hoses 304, to three longitudinally aligned vacuum or suction heads 305. Four identical sets of such vacuum heads and attendant support structures are mounted in the bag packing station to fill each carton with four layers of three bags.

Figure 12:
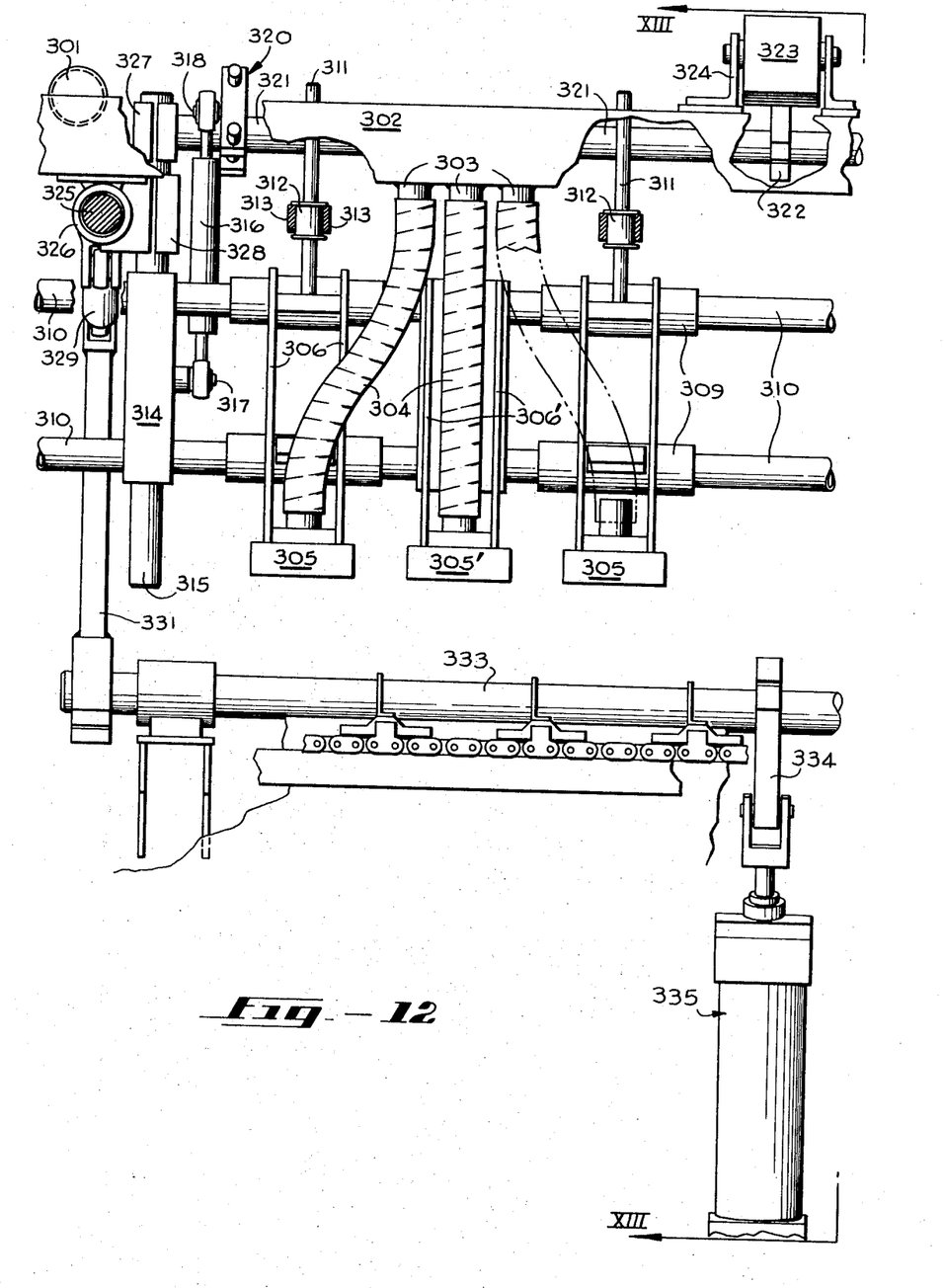
FIG. 12 is a front elevational view of three vacuum head assemblies employed in the bag packing station, with parts broken-away for clarification purposes.

Each outer vacuum head of each group of three heads is secured to a support bracket 306 mounted on a support member 307 by a pivot pin 308 and mounting bushings 309 and tubes 310 (FIG. 12). A spindle 311 (FIGS. 12 and 14) has a spool-like cam follower 312 rotatably mounted thereon to engage a stationary cam track 313. The lower end of the spindle is secured to support bracket 306 and reciprocates in cam follower 312, as illustrated sequentially in FIGS. 14 and 15. Middle support bracket 306' secures head 305' to tubes 310 whereas outer heads 306 are free to move axially on the tubes under the influence of cam tracks 313.

Figure 13:
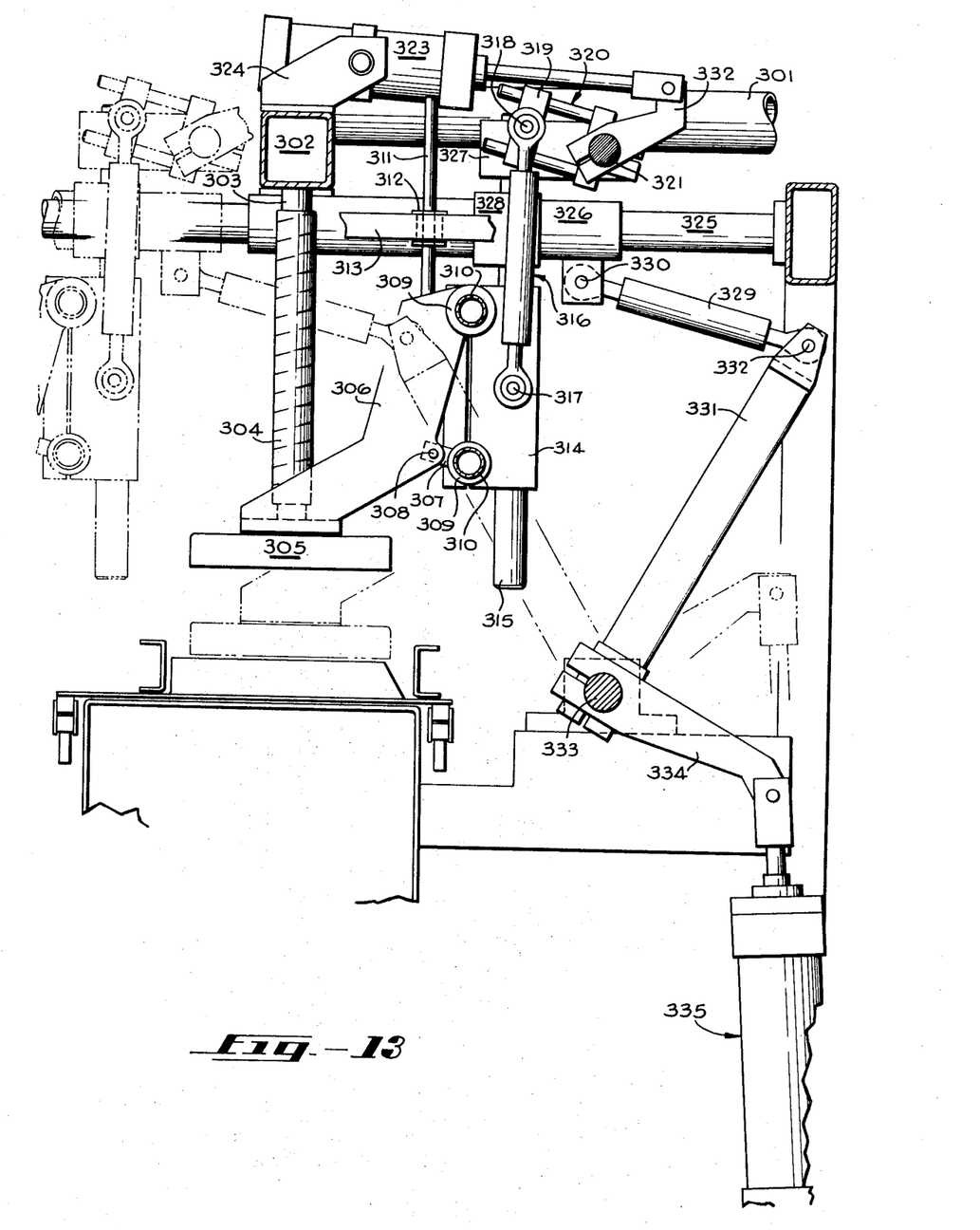
FIG. 13 is a sectional view taken in the direction of arrows XIII—XIII in FIG. 12.
Figure 14:
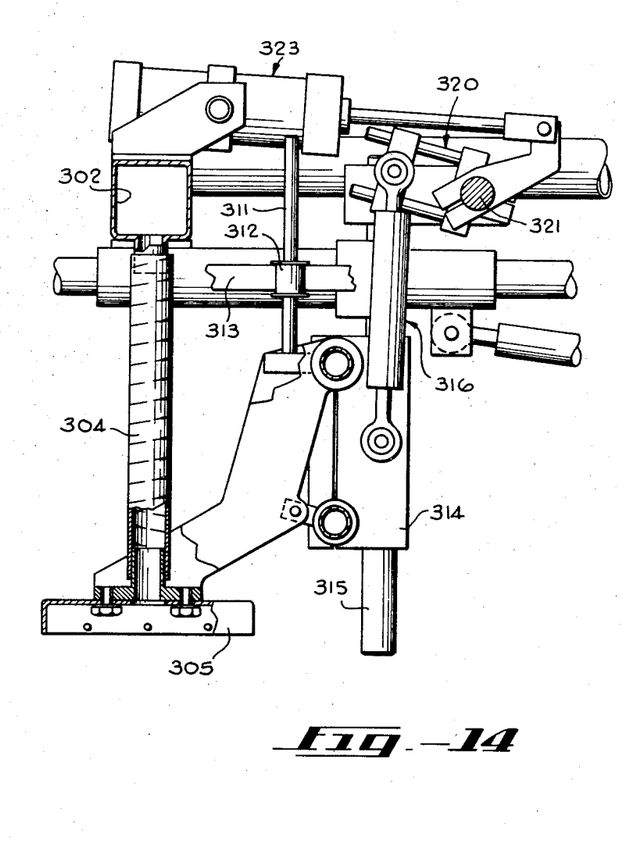
FIGS. 14 and 15 are views similar to FIG. 13, but illustrating a vacuum head assembly in raised and lowered positions, respectively, during the bag packing operation.
Figure 15:
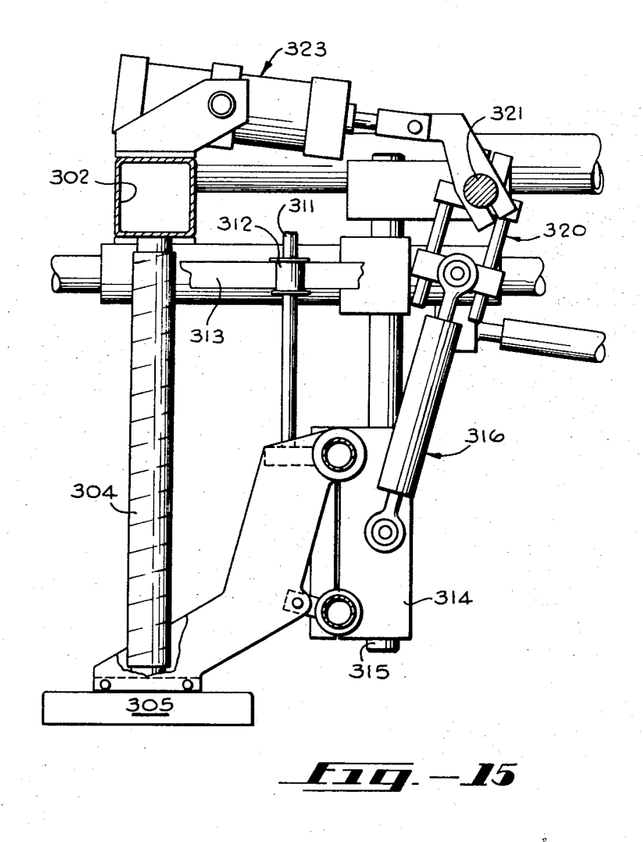
Figure 16:
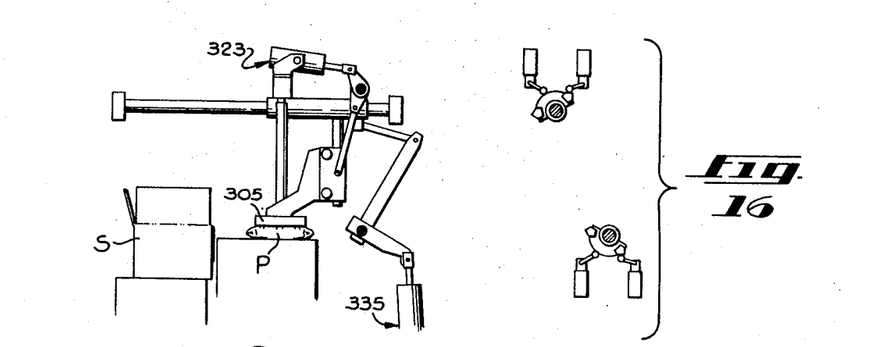
FIGS. 16–19 schematically illustrate sequential packing strips occurring in the bag packing station.
Figure 17:
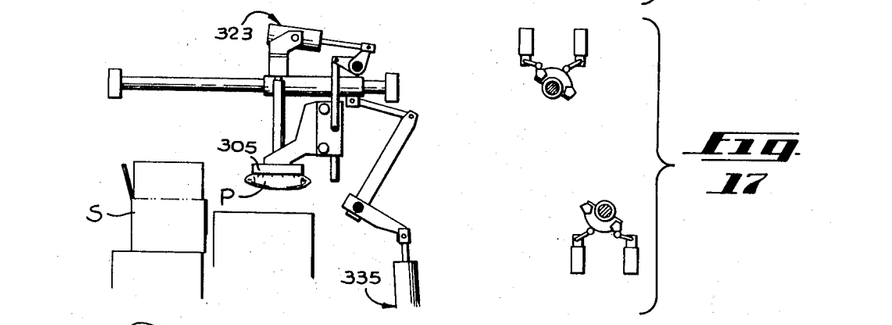
Figure 18:
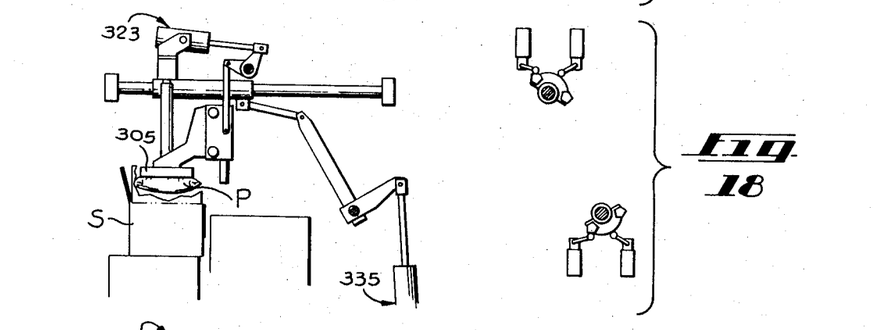
Figure 19:
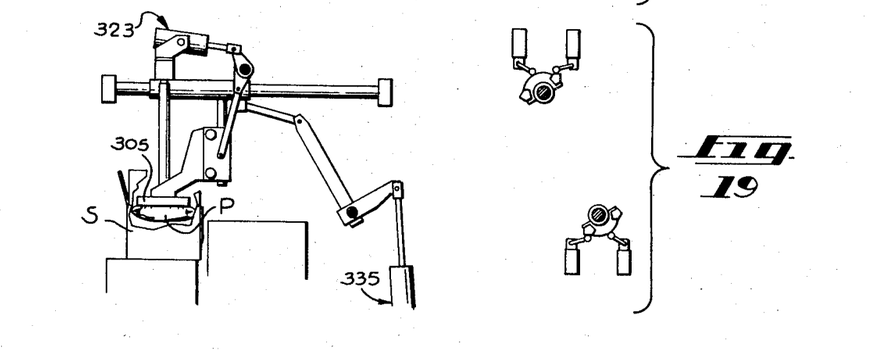

A first movable member or support block 314 is reciprocally mounted for vertical movements on a slide shaft 315 and has the lower end of a spring-loaded connector link 316 pivotally mounted thereon by a pin 317. The upper end of the link is pivotally mounted by a pin 318 on a first lever arm 319 of a first bellcrank 320. The bellcrank further comprises a rock shaft 321 having a second lever arm 322 secured to the rock shaft. Lever arm 322 is pivotally mounted to the rod end of a first double-acting cylinder 323, having its housing pivotally mounted on brackets 324 (FIG. 13). A stationary and horizontally disposed slide shaft 325 has a second movable member or cylindrical sleeve 326 slidably mounted thereon for horizontal movements.

The upper end of slide shaft 315 is secured to rock shaft 321 by a clamp 327 and to sleeve 326 by a clamp 328. A connector link 329 is pivotally connected to slide 326 by a pin 330 and to a first lever arm 331 by a pin 332. The lever arm is secured to a rock shaft 333 to form a second bellcrank with a second lever arm 334. Arm 334 is pivotally connected to the rod end of a second double-acting cylinder 335.

From the above description it can be seen that actuation of cylinder 323 will pivot first bellcrank 320, comprising arms 319 and 322, to reciprocate four sets of three vacuum heads 305 between their raised and lowered positions illustrated in FIG. 13. Upon extension of cylinder 323 to raise the vacuum heads, cylinder 335 may be actuated to pivot the second bellcrank, comprising arms 331 and 334, to move slide 326 horizontally to dispose the vacuum heads over a carton S during the packing operation. Since manifold 302, rock shaft 321, cylinder 323 they will move therewith as a unit horizontally.

METHOD OF OPERATION

In operation and assuming that the bag infeed and carton conveying stations have been suitably "precharged," conveyor belt 9 of infeed station A will move three rows of bags P through the chutes defined by guides 12 until the forward ends of a set of the three leading bags are arrested by stop gates 13. Four such sets are deposited successively onto the intermittently moved second conveying means prior to simultaneously loading the twelve bags into four cartons S. The presence of each bag at the stop gate is sensed by the feeler arm or probe of each switch 22 to assure that the bags are moved to bag conveying station B simultaneously. Hold-back rolls 17 (FIG. 2) engage the forward end of each trailing bag to hold them when stop gates 13 are opened to permit egress of the leading bags therethrough.

As shown in FIG. 3, linkage mechanism 40 is operatively connected between shafts 16 and 20 to automatically raise roller 17 when stop gates 13 are lowered (FIG. 2). Upon opening of gates 13, rollers 17 will automatically descend to engage the forward ends of the trailing bags and upon closing of gates 13 the rollers will be raised to permit the trailing bag to advance against the stop gates. Conveyor 36 continues to move the three leading bags to a forwardmost position where they trip feeler arms or probes 39 of switches 37 (FIGS. 4 and 5).

Switches 37 must be closed before switch 136 (FIG. 7) is tripped to run conveyor chains 118 by means of electrically actuated clutch of clutch and brake assembly 102. Upon such actuation, drive sprocket 110 rotates to move the conveyor chains, of the second conveying means, along flight path $F_2$ to eventually position a bag beneath each suction head 305 (twelve total bags) upon four successive feed cycles of the bag infeed and the second conveying means. Switches 134, 135, 136 and 137 are suitably entegrated into the overall control system of the apparatus to coordinate the hereindescribed packing functions.

The intermittently moving bag conveying means will stop automatically adjacent to each of the four sets of three vacuum heads 305 to permit such heads to move through the aforementioned pickup and packing sequence illustrated in FIGS. 16-19 after a bag is positioned beneath each head. Simultaneously therewith, the intermittently moving carton conveying means will move the shipping cartons S along flight path $F_3$ to sequentially move and stop each carton adjacent to each set of vacuum heads during a dwell period of operation.

During such dwell period, switch 137 (FIG. 7), for example, is tripped to condition switches 22 (FIG. 3) for repetition of the bag infeed step of the packing operation. During the packing operation, hold-down bar 235 (FIGS. 1 and 8) will hold the carton flap $S_1$, positioned on the inboard side of the shipping carton, thereunder in a non-interfering position with respect to the vacuum heads. The two outer vacuum heads of each set, when moved towards the shipping carton, will sequentially converge towards each other slightly to compress the bags together, diverge away from each other to plow side flaps $S_2$ of the carton away from each other and thereafter deposit the bags in the carton. Cam tracks 313 are suitably constructed and arranged (FIG. 1) to accomplish such packing step. After the shipping carton is filled with four layers of bags, it is removed from the carton conveying means for shipping purposes.

What is claimed is:

1. A method for packing articles in a carton comprising the steps of
   moving a first plurality and layer of articles and a second plurality and layer of articles along a first flight path in tandem,
   moving only said first layer of articles from and transversely to said first flight path and along a second flight path while simultaneously holding back said second layer of articles, moving cartons along a third flight path, parallel to said second flight path, removing said first layer of articles from said second flight path, depositing said first layer of articles in a respective one of said cartons, and repeating all of the above said moving, removing and depositing steps to deposit said second layer of articles on said first layer of articles in a respective one of said cartons.

2. The method of claim 1 further comprising the steps of guiding at least two parallel files of articles in a respective chute during their movement along said first flight path.

3. The method of claim 2 further comprising the steps of closing each of said chutes for preventing the passage of a leading article thereby and alternately opening each chute to permit the passage of such leading article thereby.

4. The method of claim 3 further comprising the step of holding a trailing article, disposed in trailing relationship to each of said leading articles, in response to the opening of each of said chutes.

5. The method of claim 1 wherein said articles are moved intermittently along said second flight path.

6. The method of claim 5 wherein said articles are stopped and moved intermittently along said second flight path at substantially equal time intervals.

7. The method of claim 3 wherein said removing and depositing steps comprise sequentially moving suction heads downwardly into attached engagement with respective articles, moving each head and attached article over a carton, and releasing and depositing such articles in said carton.

8. The method of claim 1 further comprising the steps of substantially simultaneously and intermittently stopping the movement of said articles and said cartons to transversely align said first layer of articles with one carton, removing said first layer of articles from said second flight path and depositing the first layer of articles in said one carton.

9. The method of claim 8 further comprising the steps of moving said one carton a predetermined distance along said third flight path while simultaneously preventing said articles from moving along said second flight path, stopping said one carton, removing said second layer of articles from said second flight path, and depositing said second layer of articles on said first layer of articles in said one carton.

* * * * *